United States Patent [19]
Converse

[11] Patent Number: 5,366,326
[45] Date of Patent: Nov. 22, 1994

[54] HOLE SAW GUIDE

[76] Inventor: Jeffrey M. Converse, 548 Morgan Dr., Mt. Morris, Mich. 48458

[21] Appl. No.: 138,998

[22] Filed: Oct. 21, 1993

[51] Int. Cl.⁵ .............................................. B23B 49/02
[52] U.S. Cl. .................................... 408/72 B; 408/81; 408/204; 408/241 B
[58] Field of Search ......................... 408/72 B, 79–82, 408/115 R, 115 B, 204, 241 B

[56] References Cited
U.S. PATENT DOCUMENTS 2,747,948  5/1956  Jergens .............................. 408/82 X
4,579,486  4/1986  Damico ................................ 408/204

FOREIGN PATENT DOCUMENTS 240211  9/1989  Japan ..................................... 408/82

Primary Examiner—Steven C. Bishop
Attorney, Agent, or Firm—Hugh E. Smith

[57] ABSTRACT

A hole saw guide for alignment of a hole saw used to enlarge an existing hole. The hole saw guide includes a perforated cylindrical plug fitted to an existing hole. The perforation accepts the hole saw pilot drill member permitting free rotation. The perforated cylindrical plug includes a stop which prevent passage of the plug through the existing hole. The hole saw guide may include mechanisms for diametric adjustment to lock the plug in the existing hole.

7 Claims, 4 Drawing Sheets

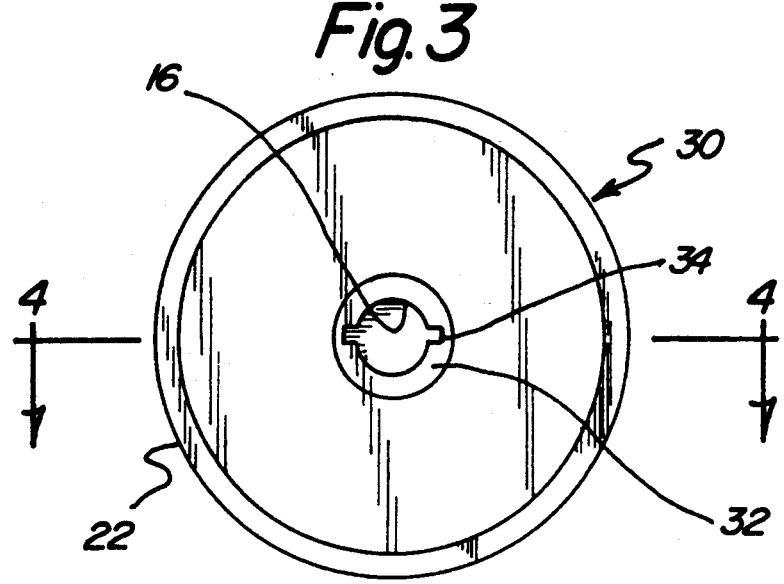
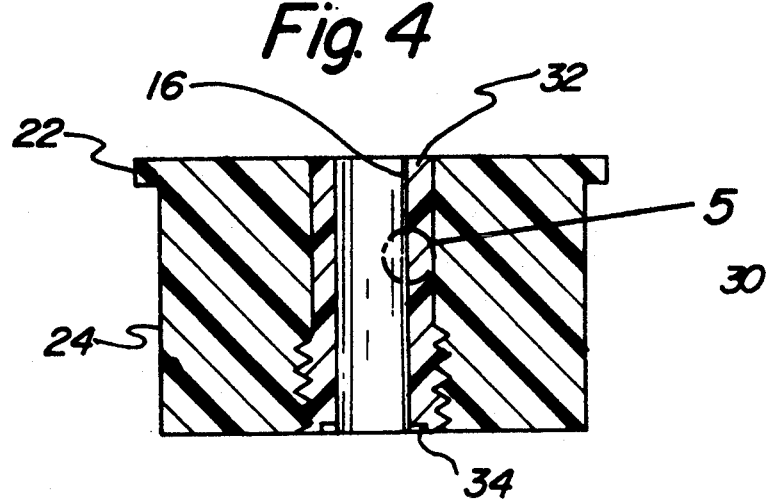

HOLE SAW GUIDE

BACKGROUND OF THE INVENTION

1. Field of the Invention

The present invention generally relates to a hole saw guide apparatus for guiding hole boring tools and more particularly pertains to a hole saw guide which may be utilized for enlarging existing holes in a workpiece.

2. Description of the Prior Art

The use of a hole saw guide is known in the prior art. More specifically, hole saw guides heretofore devised and utilized for the purpose of enlarging existing holes are known to consist basically of familiar, expected and obvious structural configurations, notwithstanding the myriad of designs encompassed by the crowded prior art which have been developed for the fulfillment of countless objectives and requirements.

For example, U.S. Pat. No. 4,579,486 to Damico discloses a Hole Saw Guide used to position a hole saw while forming a new hole of larger diameter with or without maintaining concentricity with the existing hole. The Damico invention permits enlargement of an existing hole by employing a plurality of screws and locking nuts or sliding arms to engage the existing hole sidewalls and thereby locating a guide hole for the pilot drill of a larger hole saw. The Damico invention means for assuring concentricity of the enlarged hole with respect to the existing hole comprises adjustable arms or screws which engage the sidewalls of the existing hole. Since there is no provision for maintaining an isometric relationship of the independently adjustable arms or screws there cannot be an assurance of concentricity without difficult and tedious readjustment and mensuration. The present invention has the advantage of assured concentricity by maintaining the axis of the pilot drill hole on the existing hole axis.

In U.S. Pat. Nos. 5,074,722 to Cochran, 4,596,499 to Fangmann, and 5,069,584 to Obermeier various forms of rotary cutting and drilling tools are disclosed. A disadvantage in this prior art is the lack of a means for employing a common hole saw for enlarging a previously bored hole in the workpiece. The present invention employs an inexpensive common hole saw to perform hole enlargement.

In U.S. Pat. No. 3,630,632 to Holleman a centering attachment for a cylinder boring device is described. This prior art, although devised for cylinder boring, has application to enlarging deep existing holes by employing a boring bar with centering means and does not have the advantage of application to the more commonly used hole saw. A disadvantage resulting from the centering means disclosed in this prior art renders its use unsuitable for reforming shallow holes of uniform resulting diameter unless a short concentric cylinder is applied. Application of the short concentric cylinder is generally unfeasible without the addition of costly apparatus. The present invention enables enlarging existing holes without application of an external cylinder or excessive cost.

As illustrated by the background art, efforts are continuously being made to attempt to form and enlarge holes. No prior effort, however, provides the benefits attendant with the present invention. Additionally, the prior patents and commercial techniques do not suggest the present inventive combination of component elements arranged and configured as disclosed and claimed herein.

Therefore, it can be appreciated that there exists a continuing need for a hole saw guide which can be employed to provide a means for enlarging existing holes. In this regard, the present invention substantially fulfills this need.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types now present in the prior art, the present invention provides an improved hole saw guide construction wherein the same can be utilized for enlarging existing holes. As such, the general purpose of the present invention, which will be described subsequently in greater detail, is to provide a new and improved hole saw guide apparatus and method which has all of the advantages of the prior art hole saw guide methods and none of the disadvantages.

The invention is defined by the appended claims with the specific embodiment shown in the attached drawings. For the purpose of summarizing the invention, the invention may be incorporated into a set of thick perforated discs in which each disc diameter is a snug or slight taper fit to potential existing holes of standard hole saw diameters. The perforation diameter is selected to accept a pilot drill and furthermore is centrally located and coaxial with the disc sidewall. In operation the disc is placed or tapped into the existing hole selected for enlargement, a hole saw of the appropriate larger diameter is then employed to cut a larger hole using the fixed disc as a guide for the hole saw pilot drill.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention may be better understood so that the present contribution to the art can be more fully appreciated. Additional features of the invention will be described hereinafter which form the subject of the claims of the invention. It should be appreciated by those skilled in the art that the conception and the disclosed specific methods and structures may readily be utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved hole saw guide comprising a right cylindrical plug having a central hole and a means for fitting various existing hole diameters; wherein the plug is applied to an existing hole, and the central hole is a used as a low friction bearing and guide for the pilot drill member of a conventional hole saw which is operationally employed to enlarge the existing hole.

It is another object of the present invention to provide a new and improved hole saw guide which may be easily and efficiently manufactured and marketed.

It is a further object of the present invention to provide a new and improved hole saw guide which is of a durable and reliable construction.

An even further object of the present invention is to provide a new and improved hole saw guide which is susceptible of a low cost of manufacture with regard to both materials and labor, and which accordingly is then susceptible of low prices of sale to the consuming public, thereby making such hole saw guide economically available to the buying public.

Still yet another object of the present invention is to provide a new and improved hole saw guide which provides in the apparatuses and methods of the prior art some of the advantages thereof, while simultaneously overcoming some of the disadvantages normally associated therewith.

Still another object of the present invention is to provide a new and improved hole saw guide which serves a purpose of enlarging existing holes.

Yet another object of the present invention is to provide a new and improved hole saw guide which incorporates a low friction pilot drill bearing sleeve which reduces frictional wear thereby providing the hole saw guide with an enhanced lifetime.

Yet another object of the present invention is to provide a new and improved hole saw guide which enhances safety in operations involving hole enlargement in the construction and furniture building industries.

Even still another object of the present invention is to provide a new and improved hole saw guide thereby having a beneficial impact on the rotary cutting and boring industry in general.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding may be had by referring to the summary of the invention and the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of an alternate embodiment of the hole saw guide.

FIG. 4 is a side sectional view of the alternate embodiment of the hole saw guide taken substantially upon the plane indicated by the section line 4—4 of FIG. 3.

DESCRIPTION OF THE PREFERRED EMBODIMENT

Figure 1:
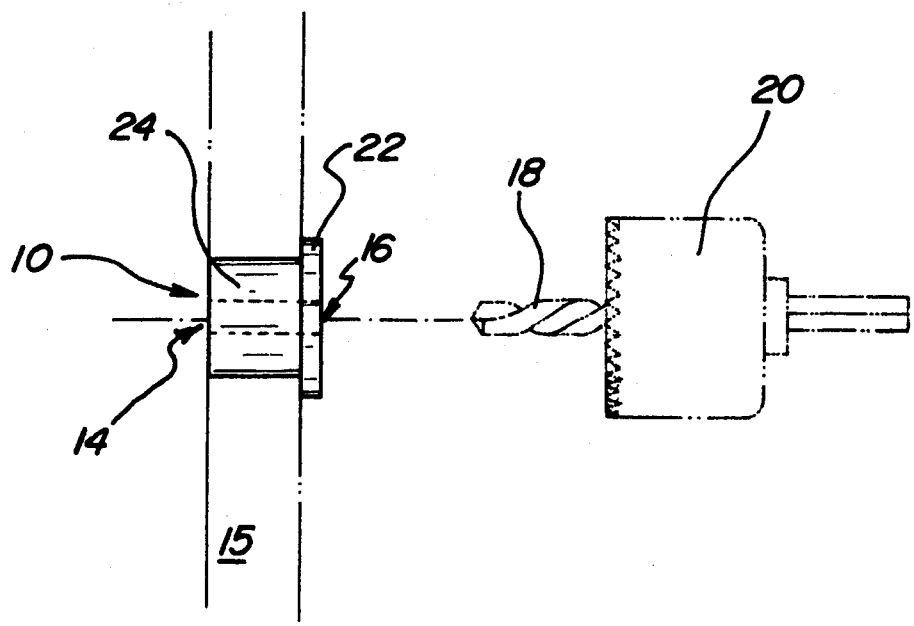
FIG. 1 is a side elevational view of a hole saw guide and a hole enlarging hole saw in a pre-operation alignment position.

With reference now to the drawings, and in particular to FIG. 1 thereof, a new and improved hole saw guide embodying the principle and concepts of the present invention and generally designated by the reference numeral 10 will be described.

Figure 2:
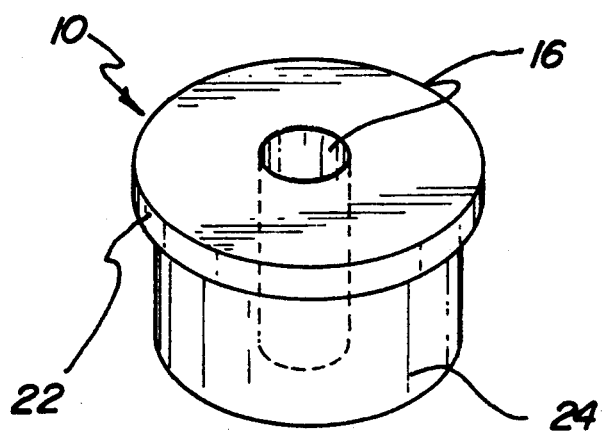
FIG. 2 is a perspective view of the hole saw guide.

From an overview standpoint, the hole saw guide 10 is adapted for use by a human to enlarge existing holes. The hole saw guide 10 comprises three major components, a cylindrical plug 24 snugly fitting an existing hole 14 in workpiece 15, a concentric through hole 16 accepting and permitting free rotation of a standard size pilot drill member 18 of a typical hole saw 20, and a lip 22 preventing slippage of hole saw guide 10 through existing hole 14. See FIGS. 1 and 2. The hole saw guide 10 may be utilized by inserting the hole saw guide 10 into existing hole 14 providing a snug fit of body 24 to existing hole 14. The hole saw 20 is selected to produce an appropriately larger finished hole diameter. Hole saw 20 is rotated to effect cutting action and pilot drill member 18 is inserted into concentric hole 16 which maintains hole saw 20 in a concentric relationship with existing hole 14 throughout the process of cutting a larger hole in workpiece 15.

More specifically, it will be noted that the hole saw guide 10 comprises a right cylindrical plug of body 24 snugly fitting the existing hole 14 generated by a common hole saw, a concentric hole 16, and lip 22. Diametric sizes of existing holes 14 commonly encountered are ¾ inch, ⅞ inch, 1 inch, 11/8 inch, and 1-¼ inch, however larger and smaller sizes may be encountered in practice as well as metric or alternate incremental size variants. Therefore in practical application of this embodiment of hole saw guide 10 a set of hole saw guides exhibiting various standard diameters will be available. A common diameter for pilot drill member 18 diameter is ¼ inch, however other diameters may enter common usage to accommodate changing standards and metric measure. Concentric hole 16 diameter is fixed at a size permitting free rotation of pilot drill member 18 during the hole enlargement process, therefore the set of hole saw guides must also reflect compatible dimensioning of concentric hole 16. With reference to FIG. 1, lip 22 is seen to abut one side of the workpiece 15 when the hole saw guide 10 is operationally disposed and is employed to preclude further movement of hole saw guide 10 into existing hole 14. The overall diameter of hole saw guide 10 as measured across lip 22 must be sufficiently great to prevent movement of hole saw guide 10 into existing hole 14 and be sufficiently small to fit within the hollow body of any larger hole saw 20 permitting free rotation of all parts of hole saw 20. The height of the right cylinder forming body 24 may vary over wide ranges although inadequate height will permit forcible misalignment of the hole saw 20 rotational axis and the axis of the existing hole 14 resulting in a tilted enlarged hole or a final hole size larger than desired. And combined body 24 and lip 22 heights greatly exceeding the maximum cutting depth capability of hole saw 20 do not provide material advantages. A taper applied to the sidewalls of body 24 may be employed to compensate body 24 diameter for small variations in existing hole 14 diameter.

Figure 5:
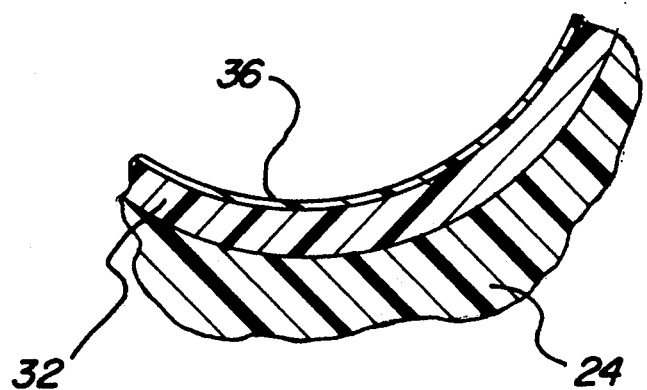
FIG. 5 is a fragmentary sectional plan view of the alternate embodiment of the hole saw guide.

In an alternate embodiment 30 the hole saw guide 10 is modified to include a replaceable center section 34 which is threadedly attached to hole saw guide 10 body 24. See FIGS. 3 and 4. Screw driver slots 34 are provided on center section 32 to facilitate replacement when worn or when a differing pilot drill member 18 diameter is used. FIG. 5 shows the introduction of a low friction liner 36 to the bore of replaceable center 32. The low friction liner 36 may comprise a fluoropolymer such as Teflon (Dupont Trademark), or a bushing such as oil impregnated bronze, or any substance demonstrating low friction and low wear characteristics. The low friction liner 36 may be applied to the any embodiment whether the replaceable center 32 is present or absent.

Figure 8:
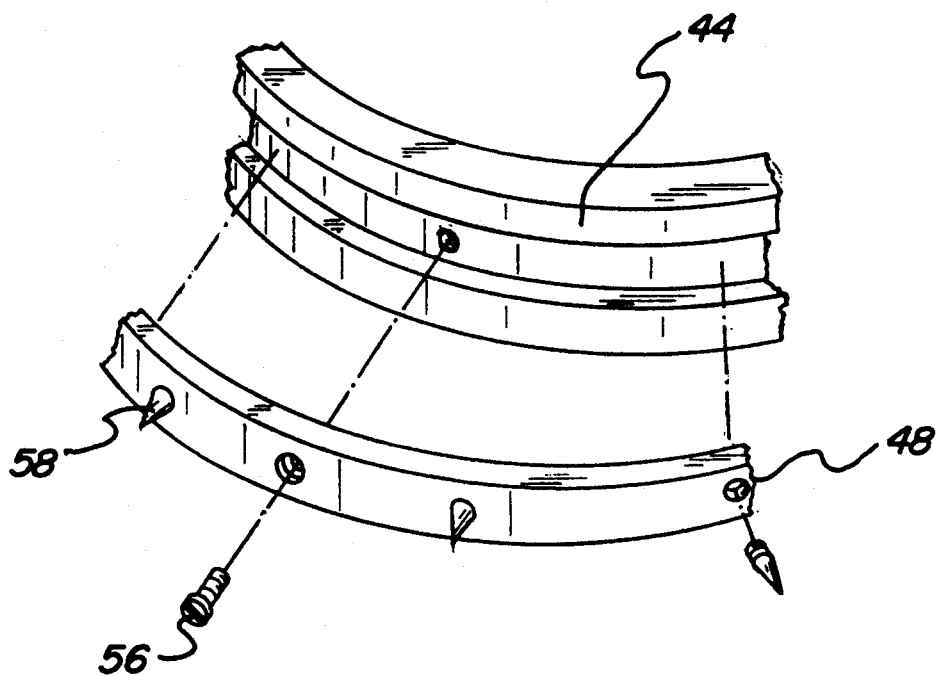
FIG. 8 is an exploded fragmentary perspective view of the hole saw guide alternate embodiment.
Figure 6:
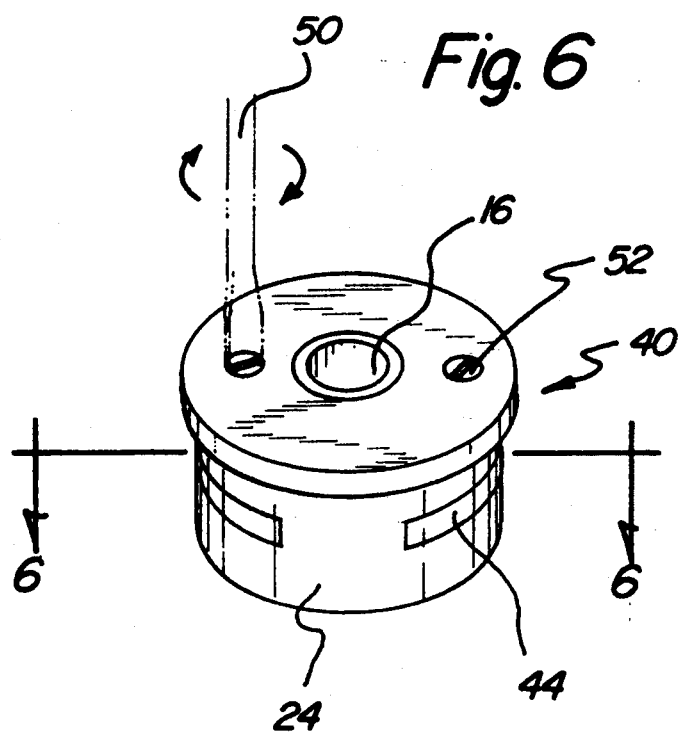
FIG. 6 is a perspective view of an alternate embodiment of a hole saw guide.
Figure 7:
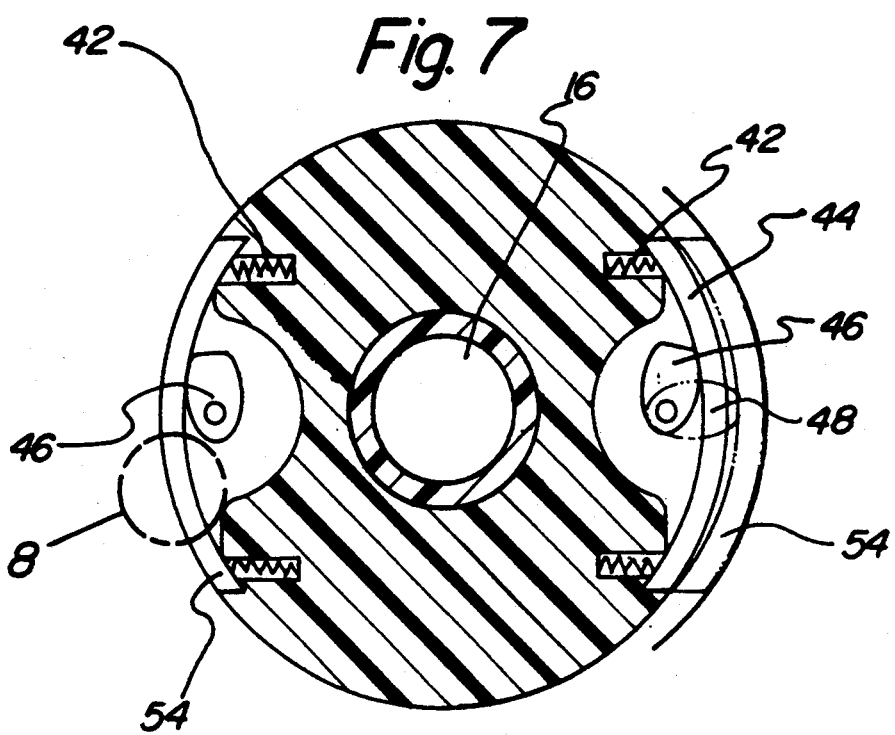
FIG. 7 is a plan sectional view of the alternate embodiment of the hole saw guide taken substantially upon the plane indicated by the section line 6—6 of FIG. 5.

In another alternate embodiment 40 the hole saw guide is modified to include a means for securely holding the hole saw guide 10 in a snug fit relationship with existing hole 14. Referring to FIGS. 6, 7, and 8 a diametric expansion and locking of hole saw guide 10 in the workpiece 15 is accomplished by a series of springs 42, braces 44, cams 46, and grippers 48. A screw driver engages shaft 52 which causes cam 46 to pivot. Cam 46 applies force to brace 44 which moves outward to contact the bore of existing hole 14. At the end of rotational travel of cam 46, flat 48 contacts brace 34 and maintains brace 34 in extended position 54. Grippers 48 affixed to brace 44 by one or more screws 56 are provided with a multiplicity of spikes 58 which engage the sidewalls of existing hole 14 thereby preventing movement of the hole saw guide 10 during the hole enlargement process. Upon completion of the hole enlargement process cam 46 may be rotated to an original position using screw driver 50. A plurality of springs 42 are employed to restore the original position of brace 44.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A hole saw guide for use in combination with a hole saw for enlarging an existing hole in a work piece, said hole saw guide comprising:
   an alignment means to maintain a hole saw rotational axis in a concentric relationship with an existing hole axis; and,
   a bearing means disposed in said alignment means to permit free rotation of a hole saw pilot member within said alignment means;
   wherein said alignment means is an insertable plug fitting the existing hole, the plug comprising a tapered right cylinder with a central concentric hole comprising said bearing means.

2. A hole saw guide for use in combination with a hole saw for enlarging an existing hole in a work piece, said hole saw guide comprising:
   an alignment means to maintain a hole saw rotational axis in a concentric relationship with an existing hole axis; and,
   a bearing means disposed in said alignment means to permit free rotation of a hole saw pilot member within said alignment means;

wherein said alignment means is an insertable plug fitting the existing hole, the plug comprising a solid right cylinder with a threaded central concentric hole and a threaded bushing threadedly inserted into said threaded central concentric hole, said bushing having a second central concentric hole comprising said bearing means.

3. A hole saw guide comprising:

an alignment means to maintain a hole saw rotational axis in a coincident relationship with an existing hole axis;
   a bearing means disposed in said alignment means to permit free rotation of a pilot member within said alignment means; and
a securing means connected to said hole saw guide which locks said hole saw guide in an existing hole;
wherein said securing means comprises:
   a rotary shaft disposed in said hole saw guide;
   a cam mounted upon said shaft; and
   a brace connected to said hole saw guide by a spring;
   whereby, when said shaft is rotated, said cam contacts, expands, and locks said brace into said existing hole.

4. The hole saw guide of claim 3 and further comprising a toothed element attached to said braces which engages soft workpiece materials precluding slipping of said hole saw guide in the workpiece.

5. The hole saw guide of claim 3, wherein said bearing means further comprises a replaceable bearing member.

6. The hole saw guide of claim 3 wherein said bearing means comprises a low friction bearing surface.

7. The hole saw guide of claim 6 in which the low friction bearing surface is a fluoropolymer.

* * * * *